(12) United States Patent
Humfeld et al.

(10) Patent No.: US 9,731,453 B2
(45) Date of Patent: Aug. 15, 2017

(54) CO-CURING PROCESS FOR THE JOINING OF COMPOSITE STRUCTURES

(71) Applicant: The Boeing Company, Chicago, IL (US)

(72) Inventors: Keith D. Humfeld, Federal Way, WA (US); Karl M. Nelson, Issaquah, WA (US)

(73) Assignee: The Boeing Company, Chicago, IL (US)

(*) Notice: Subject to any disclaimer, the term of this patent is extended or adjusted under 35 U.S.C. 154(b) by 288 days.

(21) Appl. No.: 14/639,112

(22) Filed: Mar. 4, 2015

(65) Prior Publication Data

US 2016/0257427 A1  Sep. 8, 2016

(51) Int. Cl.
*B29C 70/30* (2006.01)
*B29C 65/02* (2006.01)
(Continued)

(52) U.S. Cl.
CPC .......... *B29C 70/30* (2013.01); *B29C 35/0266* (2013.01); *B29C 65/02* (2013.01); *B29C 65/505* (2013.01); *B29C 65/5014* (2013.01); *B29C 65/5021* (2013.01); *B29C 66/112* (2013.01); *B29C 66/12821* (2013.01);
(Continued)

(58) Field of Classification Search
CPC ............... B64F 5/10; B29L 2031/3076; B29L 2031/3082; B29L 2031/3085; B32B 2605/18; Y02T 50/433; B29C 66/112; B29C 66/1122; B29C 66/12; B29C 66/122; B29C 66/1222; B29C 66/12221; B29C 66/1226; B29C 66/12261; B29C 66/124; B29C 66/12443; B29C 66/124745; B29C 66/12449; B29C 66/1246; B29C 66/12463; B29C 66/12464; B29C 66/12469; B29C 66/1248; B29C 66/128; B29C 66/1282; B29C 66/12821; B29C 66/12822; B29C 66/1284; B29C 66/12841;
(Continued)

(56) References Cited

U.S. PATENT DOCUMENTS 6,284,089 B1  9/2001 Anderson
8,307,872 B2  11/2012 Kendall
(Continued)

FOREIGN PATENT DOCUMENTS

EP           2808157 A1   12/2014
WO    WO2009153271 A1   12/2009

OTHER PUBLICATIONS

Extended European Search Report, Appl. No. 16156646.8, dated Sep. 8, 2016.

*Primary Examiner* — Carson Gross

(57) ABSTRACT

A method of fabricating a composite assembly may include providing a first laminate and a second laminate respectively formed of first and second composite plies, and having a respective first and second cured section and a respective first and second uncured section. The method may further include interleaving the first composite plies in the first uncured section with the second composite plies in the second uncured section to form an interfacial region. The method may additionally include curing the interfacial region to join the first laminate to the second laminate and form a unitized composite assembly.

20 Claims, 14 Drawing Sheets

(51) Int. Cl.
  *B29C 35/02* (2006.01)
  *B29C 65/50* (2006.01)
  *B64F 5/10* (2017.01)
  B29L 31/30 (2006.01)
  B29C 65/00 (2006.01)
  B29C 65/14 (2006.01)
  B29C 65/18 (2006.01)

(52) U.S. Cl.
  CPC .. *B29C 66/12822* (2013.01); *B29C 66/12841* (2013.01); *B29C 66/131* (2013.01); *B29C 66/43* (2013.01); *B29C 66/524* (2013.01); *B29C 66/61* (2013.01); *B29C 66/63* (2013.01); *B29C 66/634* (2013.01); *B29C 66/721* (2013.01); *B29C 66/723* (2013.01); *B29C 66/73752* (2013.01); *B29C 66/73941* (2013.01); *B29C 66/81455* (2013.01); *B64F 5/10* (2017.01); *B29C 65/14* (2013.01); *B29C 65/18* (2013.01); *B29C 66/342* (2013.01); *B29C 66/71* (2013.01); *B29C 66/7212* (2013.01); *B29C 66/72141* (2013.01); *B29C 66/72143* (2013.01); *B29C 66/73921* (2013.01); *B29L 2031/3076* (2013.01); *B29L 2031/3085* (2013.01); *B32B 2605/18* (2013.01); *Y02T 50/433* (2013.01)

(58) Field of Classification Search
  CPC ... B29C 66/12842; B29C 66/43; B29C 66/02; B29C 66/024; B29C 66/0242; B29C 66/03; B29C 66/034
  USPC .......................................... 156/304.1, 304.6
  See application file for complete search history.

(56) References Cited

U.S. PATENT DOCUMENTS

| | | | |
|---|---|---|---|
| 8,834,668 | B2 | 9/2014 | Nelson |
| 2002/0038687 | A1* | 4/2002 | Anderson ........... B29C 65/5042 156/275.7 |
| 2009/0148647 | A1* | 6/2009 | Jones ..................... B29C 70/30 428/58 |
| 2010/0116938 | A1 | 5/2010 | Kline |
| 2010/0124659 | A1 | 5/2010 | Nelson |
| 2010/0170613 | A1 | 7/2010 | Kendall |
| 2011/0198020 | A1* | 8/2011 | Marengo ............ B29C 35/0266 156/196 |

* cited by examiner

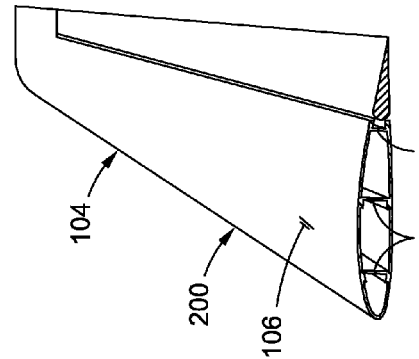
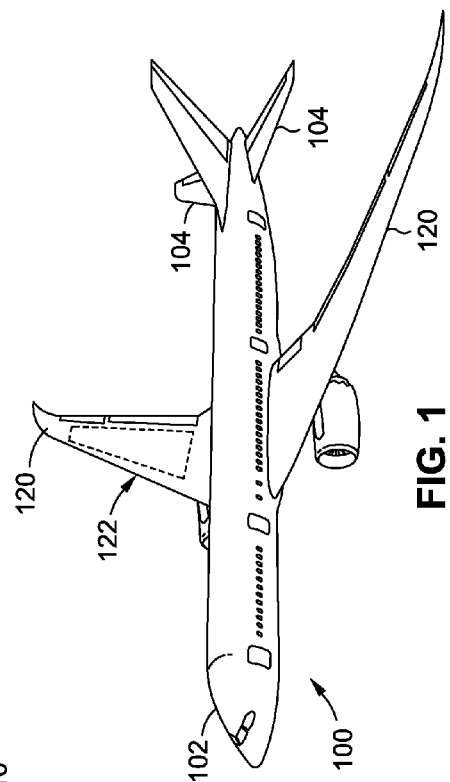
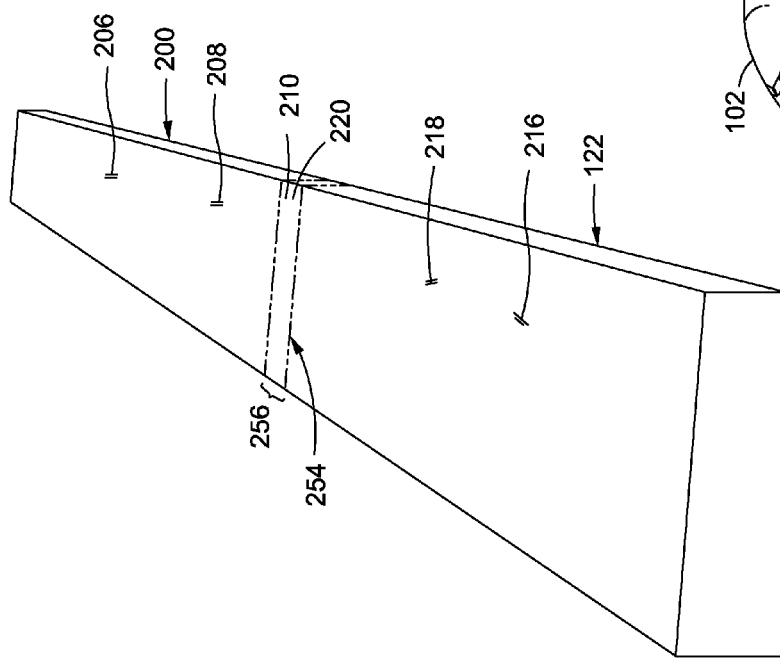

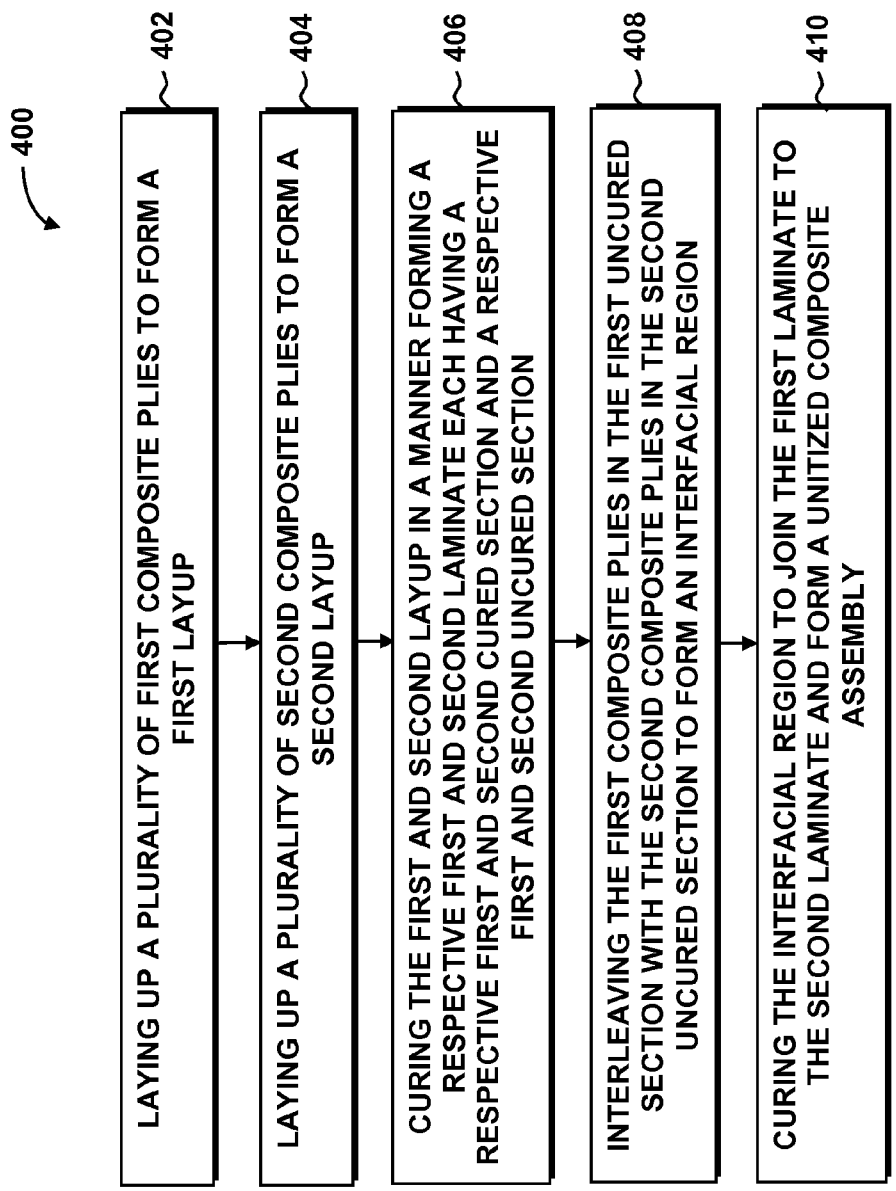

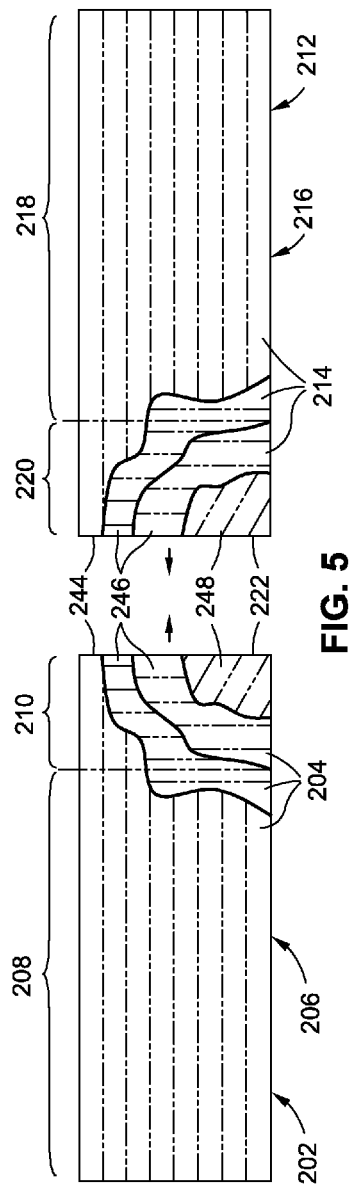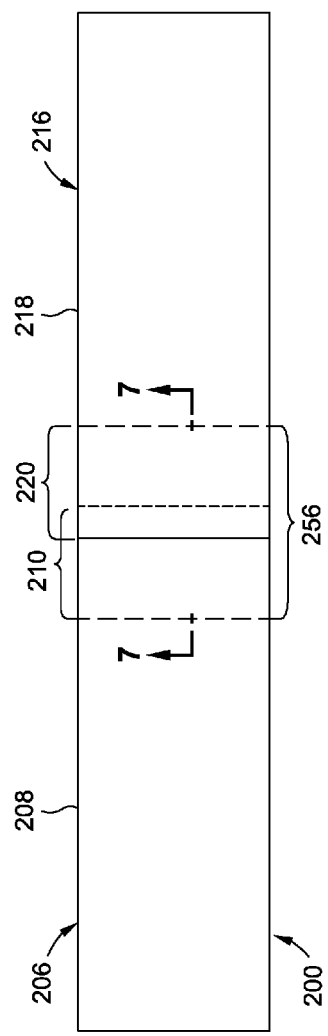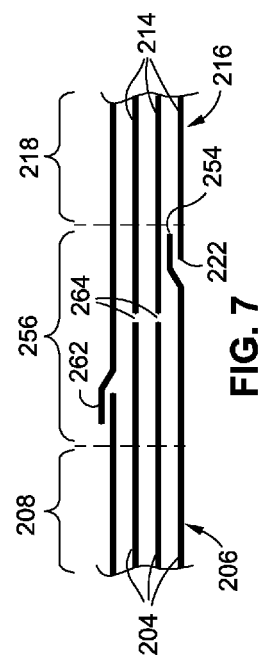

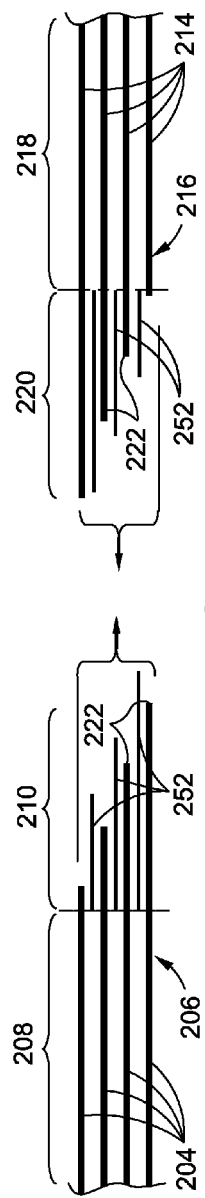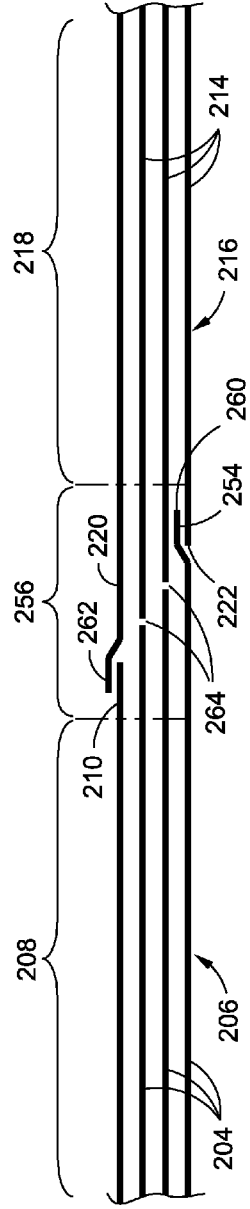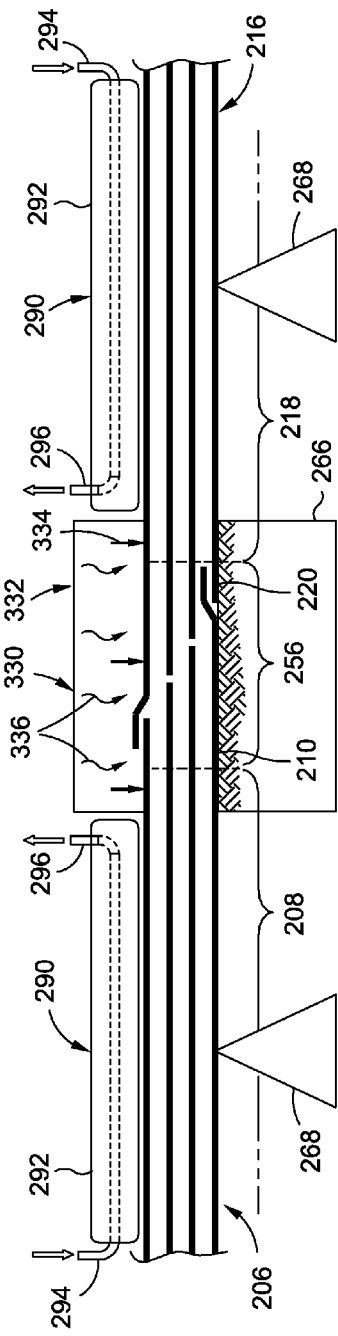

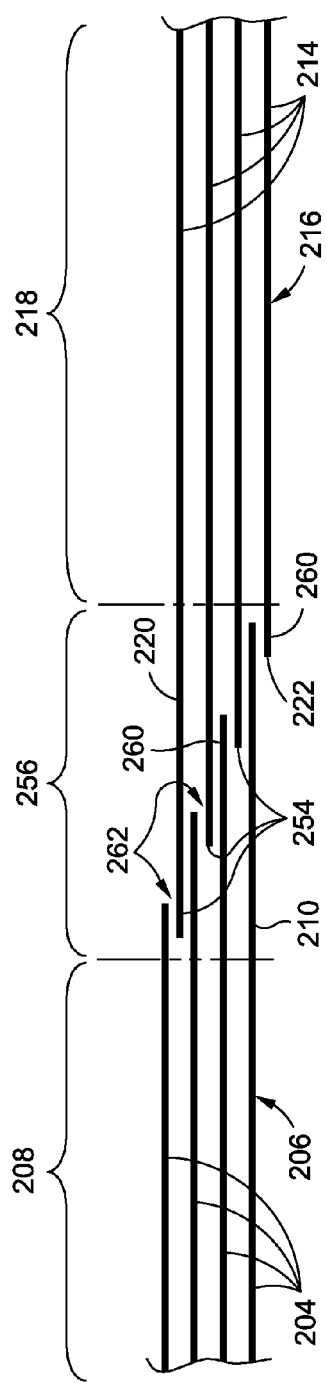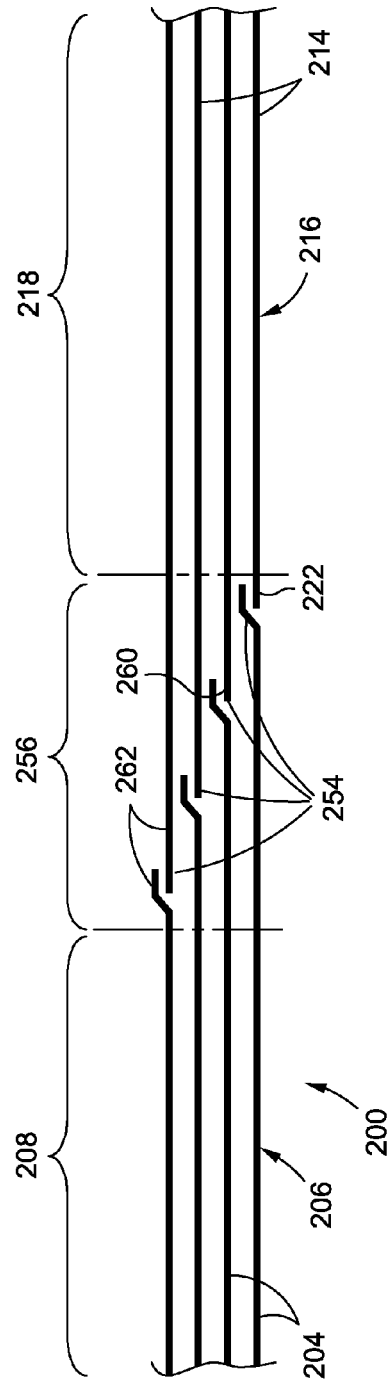

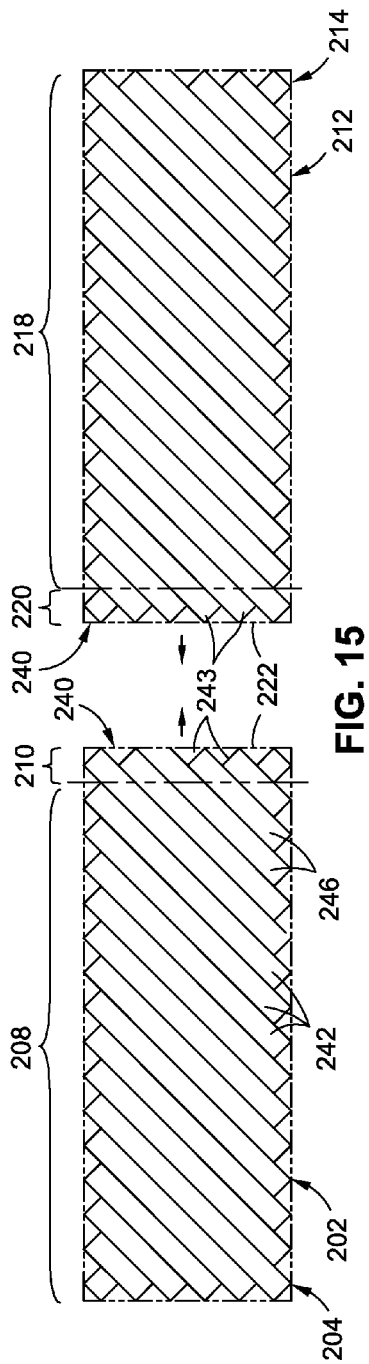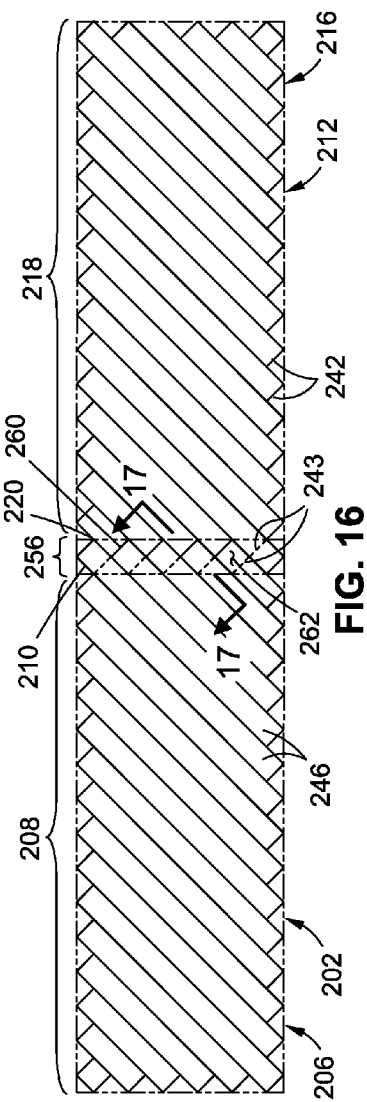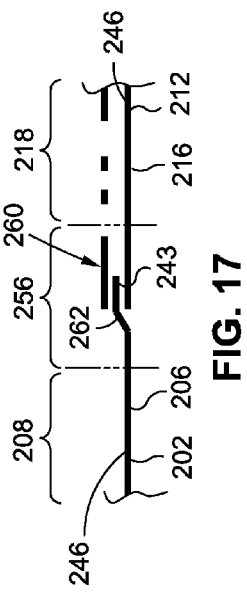

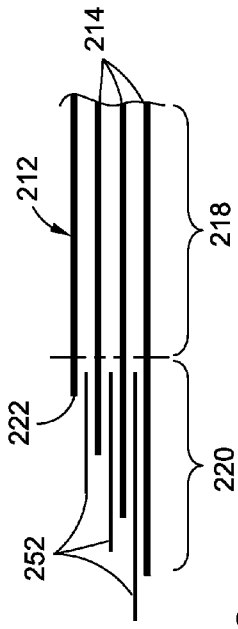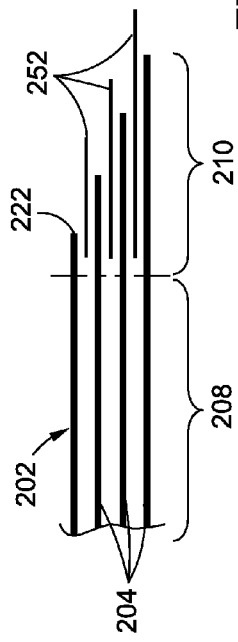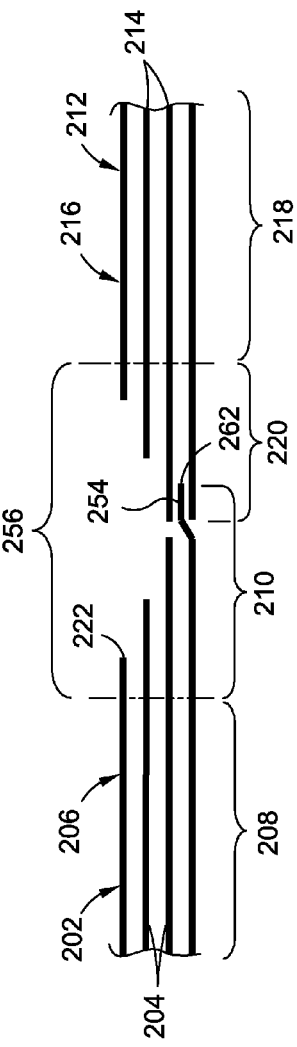

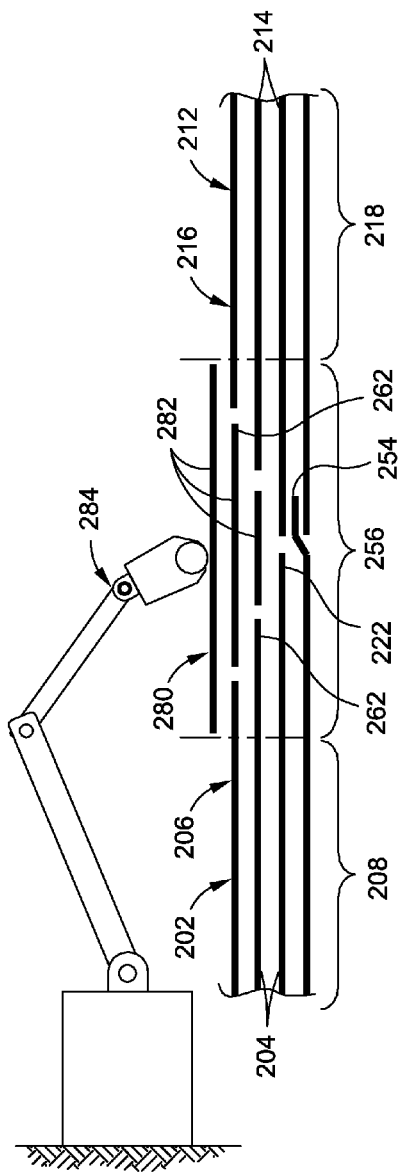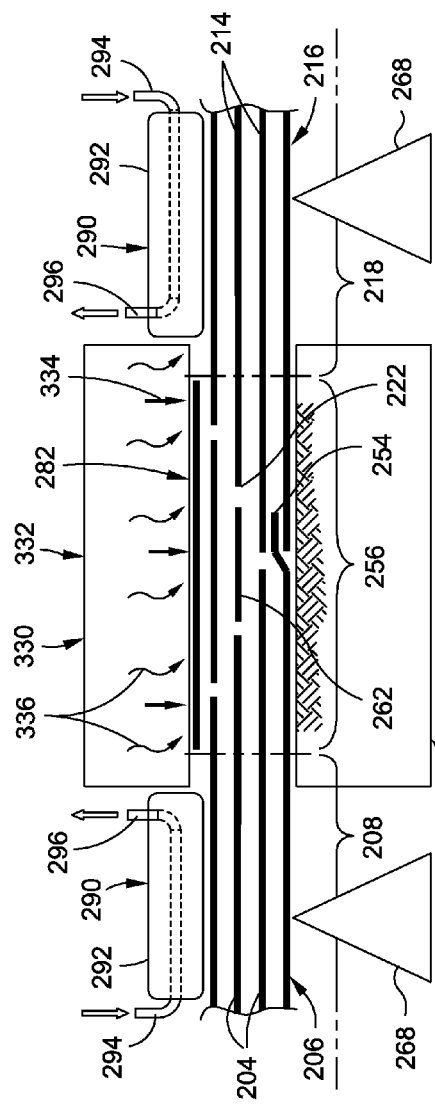

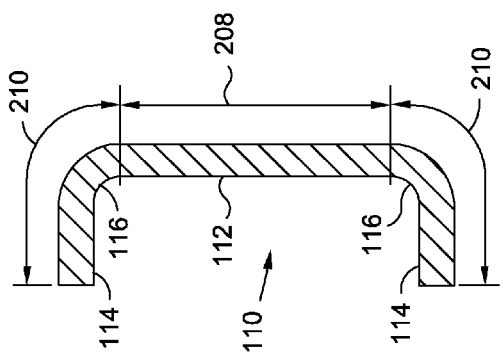
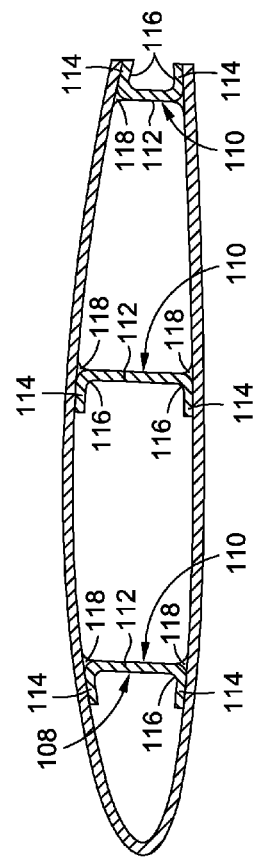
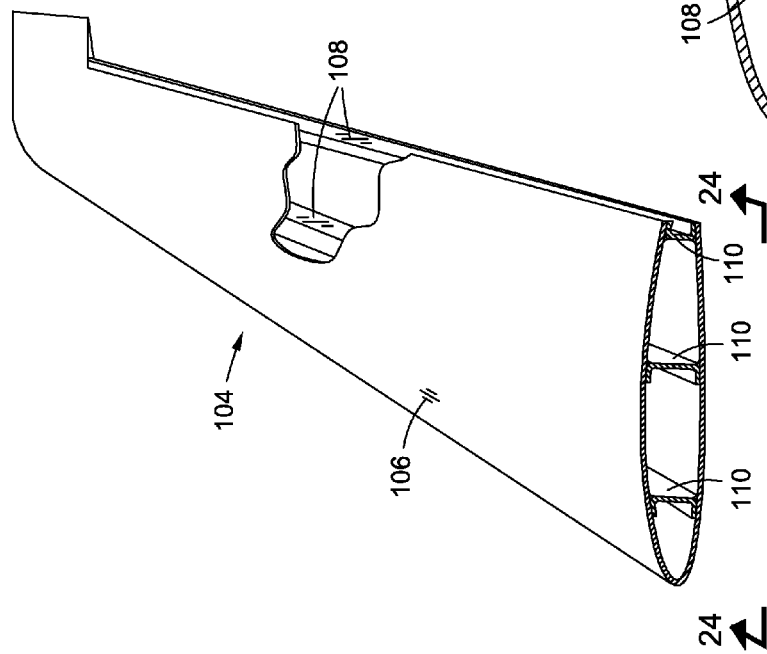
FIG. 25
FIG. 24
FIG. 23

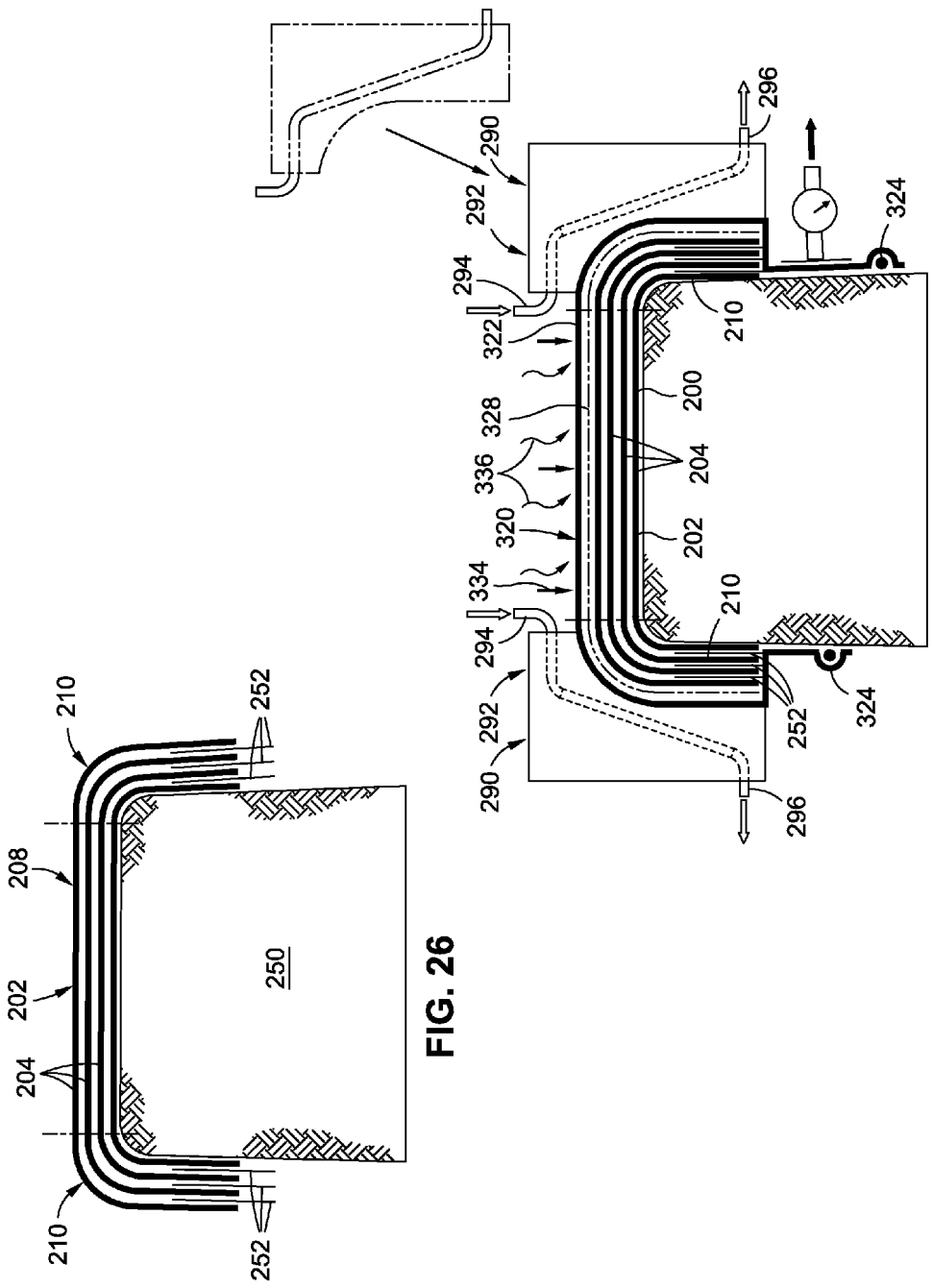

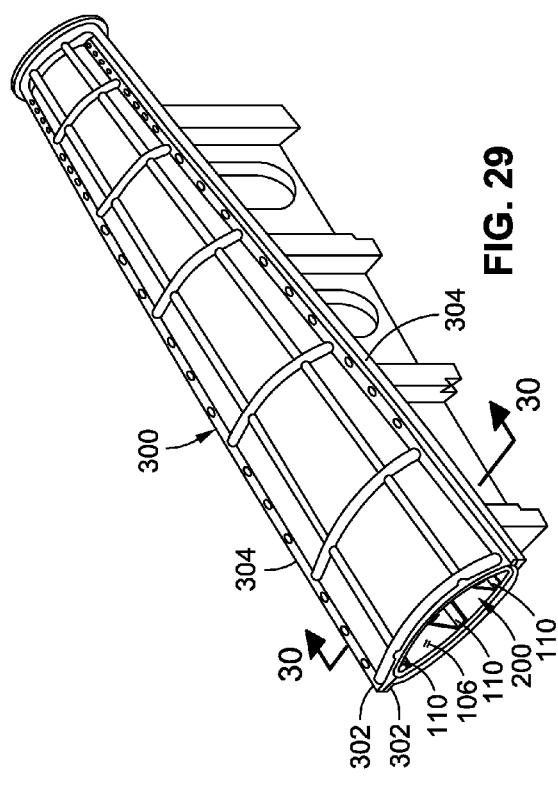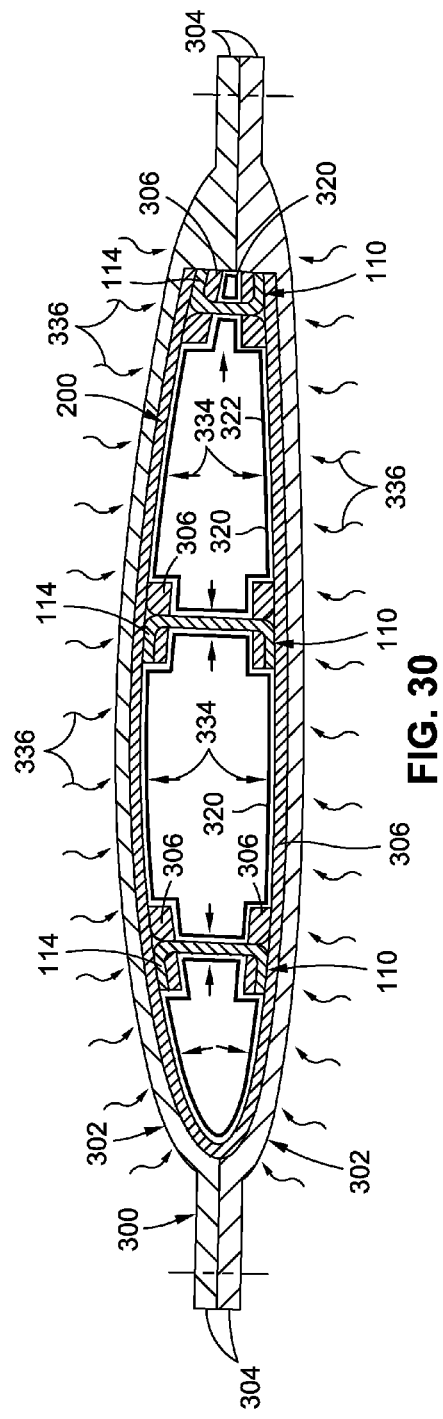

CO-CURING PROCESS FOR THE JOINING OF COMPOSITE STRUCTURES

FIELD

The present disclosure relates generally to composite manufacturing and, more particularly, to methods of assembling composite structures.

BACKGROUND

Traditional methods of fabricating composite structures include assembling cured composite components using fasteners or adhesive. The use of fasteners requires special drilling equipment for forming fasteners holes in the composite components to be joined. In addition, the process of installing individual fasteners in a plurality of fasteners holes is a time-consuming and labor-intensive process. Furthermore, the plurality of fasteners in a structural assembly adds weight which detracts from the performance capability of weight-sensitive structures such as aircraft.

Assembling a composite structure by bonding together composite components using adhesive may limit the use of the structure to applications that are not required to carry primary loads. Assembly techniques that rely on fasteners and/or adhesive may necessitate positioning of the mating (e.g., faying) surfaces of the individual components within relatively tight geometrical tolerances. The requirement for tight geometrical tolerances increases manufacturing cost and adds to manufacturing time.

Forming composite structures that are relatively large and/or which have complex geometries may present additional challenges. For example, the traditional process of curing a layup for a large composite structure may require the availability of a large autoclave for uniformly applying heat and pressure. Unfortunately, large autoclaves have high initial construction costs and high operation and maintenance costs, and may present limitations in producing composite parts at a high production rate. Composite structures that have complex geometry traditionally require separately laying up and curing individual components, and then fastening and/or adhesively bonding the components together, with the associated drawbacks mentioned above.

As can be seen, there exists a need in the art for a method of fabricating a composite structure that limits or avoids the use of fasteners and adhesive, and which allows the fabrication of composite parts that are relatively large and/or which have complex geometries.

SUMMARY

The above-noted needs associated with fabricating composite structures are specifically addressed and alleviated by the present disclosure which provides a method of fabricating a composite assembly by integrally co-curing uncured sections of two or more composite laminates. The method may include providing a first laminate and a second laminate respectively formed of first and second composite plies and having a respective first and second cured section and a respective first and second uncured section. The method may further include interleaving the first composite plies in the first uncured section with the second composite plies in the second uncured section to form an interfacial region. The method may additionally include curing the interfacial region to join the first laminate to the second laminate and form a unitized composite assembly.

In a further embodiment, disclosed is a method of fabricating a composite assembly including laying up a plurality of first composite plies to form a first layup, and laying up a plurality of second composite plies to form a second layup. The method may additionally include curing the first and second layup in a manner forming a respective first and second laminate each having a respective first and second cured section and a respective first and second uncured section. The method may further include interleaving the first composite plies in the first uncured section with the second composite plies in the second uncured section to form an interfacial region. The method may also include curing the interfacial region to join the first laminate to the second laminate and form a unitized composite assembly.

In a still further embodiment, disclosed is a method of fabricating a composite assembly including layup of a plurality of first composite plies and a plurality of second composite plies to respectively form a first layup and a second layup. The method may additionally include curing to full cure a first uncured section and a second uncured section of the respective first and second layup. The method may also include partially curing to approximately 5 percent a first uncured section and a second uncured section of the respective first and second layup. In addition, the method may include interleaving at least one of the first composite plies in the first uncured section between a pair of second composite plies in the second uncured section to form an interfacial region. The method may further include curing the interfacial region to join the first laminate to the second laminate and form a unitized composite assembly.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a diagrammatic representation of a perspective view of an aircraft;

FIG. 2 is a diagrammatic representation of a fuel tank fabricated of composite material using the method disclosed herein;

FIG. 3 is a diagrammatic representation of a horizontal stabilizer fabricated of composite material using the method disclosed herein;

FIG. 4 is a flowchart illustrating one or more operations that may be included in a method of fabricating a composite assembly;

FIG. 5 is a diagrammatic representation of a top view of a first laminate and a second laminate each having a cured section and at least one uncured section;

FIG. 6 is a diagrammatic representation of a top view of the first and second laminate joined along an interfacial region wherein a first uncured section is interleaved with a second uncured section within an interfacial region which is cured form a unitized composite assembly;

FIG. 7 is a diagrammatic representation of a sectional view of the interfacial region of FIG. 6;

FIG. 10 is a diagrammatic representation of a side view of a first laminate and a second laminate following the curing of the respective first and second cured sections;

FIG. 11 is a diagrammatic representation of a side view of the first and second laminate of FIG. 10 following the removal of the ply separators;

FIG. 12 is a diagrammatic representation of a side view of the assembled first and second laminate and illustrating the interfacial region being cured on an interfacial region cure tool to form a unitized composite assembly and further illustrating temperature control devices positioned on the first and second section during curing of the interfacial region;

FIG. 13 is a diagrammatic representation of a side view of an alternative configuration for assembling the first laminate and second laminate wherein all of the first composite plies are interleaved with the second composite plies;

FIG. 14 is a diagrammatic representation of a side view of the unitized composite assembly formed by curing the interfacial region of the first and second laminate shown in FIG. 13;

FIG. 15 is a diagrammatic representation of a top view of a 45° ply of the first and second laminate wherein the 45° ply in each of the first and second laminate is formed of unidirectional tape and have crenulated edges;

FIG. 16 is a diagrammatic representation of a top view of the first and second laminate of FIG. 15 joined along the interfacial region and illustrating the interleaving of the tape ends of the unidirectional tape of the first and second laminate;

FIG. 17 is a diagrammatic representation of a sectional view of the interfacial region of FIG. 16;

FIG. 18 is a diagrammatic representation of a side view of a further embodiment of the first and second laminate configured to receive a composite splice for splicing together the first and second composite plies within the interfacial region;

FIG. 19 is a diagrammatic representation of a side view of the first and second laminate of FIG. 18 following the removal of the ply separators;

FIG. 20 is a diagrammatic representation of a side view of the first and second laminate of FIG. 19 assembled together and illustrating one of the first composite plies of the first laminate interleaved with a pair of immediately adjacent second composite plies of the second laminate;

FIG. 21 is a diagrammatic representation of a side view of the first and second laminate of FIG. 20 during application of a plurality of composite splice plies overlapping the first and second composite plies in the interfacial region to form a composite splice for splicing together the first and second composite laminate;

FIG. 22 is a diagrammatic representation of a side view of the assembled first and second laminate of FIG. 21 during co-curing of the uncured composite splice plies with the uncured sections of the first and second composite plies in the interfacial region;

FIG. 23 is a diagrammatic representation of a perspective view of a portion of the horizontal stabilizer of FIG. 3 showing a plurality of composite spars enveloped by an uncured composite skin to form a closed composite structure;

FIG. 24 is a diagrammatic representation of an end view of the horizontal stabilizer taken along line 24 of FIG. 23 and illustrating the positioning of the composite spars within the interior of the horizontal stabilizer defined by the skin;

FIG. 25 is a diagrammatic representation of an end view of a spar illustrating the web of the spar comprising a first cured section of the spar, and further illustrating the flanges and radii comprising first uncured sections of the spar on opposite sides of the web;

FIG. 26 is a diagrammatic representation of a side view of the layup of composite plies on a layup cure tool for forming the composite spar;

FIG. 27 is a diagrammatic representation of a side view of the vacuum bagging of the composite spar on the layup cure tool for curing the first cured section of the web and including a pair of temperature control devices positioned over the corresponding pair of first uncured sections of the composite spar to prevent curing of the uncured sections;

FIG. 29 is a diagrammatic representation of a perspective view of the OML tool for curing the composite assembly of spars and skins to form the horizontal stabilizer;

FIG. 30 is a diagrammatic representation of a sectional view taken along line 30 of FIG. 29 and illustrating the application of heat and compaction pressure to the composite assembly of spars and skin against the inside surfaces of the OML tool for co-curing the uncured sections of each spar with the uncured skin;

DETAILED DESCRIPTION

Figure 8:
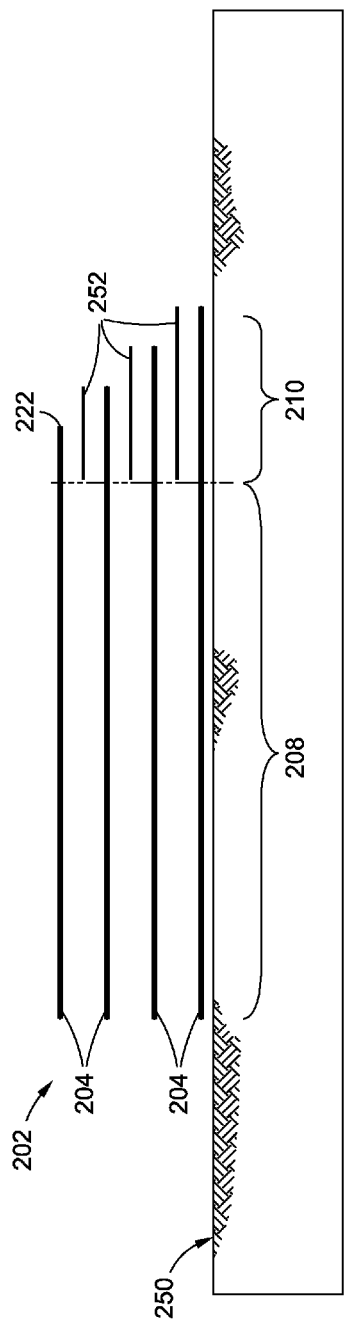
FIG. 8 is a diagrammatic representation of a side view showing a first layup including a plurality of first composite plies and illustrating ply separators separating the first composite plies within the first uncured section.

Referring now to the drawings which are provided for purposes of illustrating various embodiments of the present disclosure, shown in FIG. 1 is an aircraft 100 having one or more composite assemblies 200 that may be fabricated using the method disclosed herein. For example, the aircraft 100 may include a fuselage 102 having a pair of wings 120 which may contain one or more relatively large fuel tanks 122 as shown in FIG. 2. Using the method disclosed herein, relatively large portions of a fuel tank 122 or the entire fuel tank 122 may advantageously be fabricated by interleaving uncured sections of composite plies of composite laminates. The interleaved composite plies may define an interfacial region 256 which may be integrally co-cured to join the laminates and form a single, unitized composite assembly 200. The presently-disclosed method may allow for a reduction in the quantity of fasteners and sealant typically required for assembling individual components to form a conventional fuel tank. In some examples, the presently-disclosed method may allow for an elimination of fasteners and/or adhesive conventionally required for joining composite components.

The method may also be implemented for forming composite assemblies 200 having relatively complex geometry. For example, FIG. 3 illustrates a horizontal stabilizer 104 which may be designed as a closed box that may be closed on an outboard end of the horizontal stabilizer 104. The horizontal stabilizer 104 may be made up of a quantity of composite spars 110 assembled with a composite skin 106. Using the presently-disclosed method, uncured sections of the composite plies that make up the spars 110 and skin 106 may be interleaved and integrally co-cured to form a horizontal stabilizer 104 as a single, unitized composite assembly 200 without the use of fasteners and/or adhesive. In the present disclosure, an uncured section of a composite laminate may be described as a section that may be completely uncured or the uncured section may be partially cured to a relatively low cure state (e.g., less than 10 percent of full cure).

Although the presently-disclosed method is described in the context of fabricating large composite assemblies 200 such as an aircraft fuel tank 122 (FIG. 2), and/or fabricating complex composite assemblies 200 such as a horizontal stabilizer 104 (FIG. 3), the method may be implemented for fabricating composite assemblies 200 of any size, shape, and configuration, without limitation. Although not shown in the figures, the method may also include fabricating a unitized composite assembly 200 from one or more composite sandwich structures. A composite sandwich structure may be described as having a core material such as balsa, honeycomb, or foam sandwiched between a pair of face sheets. One or both of the face sheets may be formed of one or more composite plies of which at least one section may be uncured or partially cured (e.g., to less than 10 percent of full cure) to allow for interleaving of the composite plies of the face sheet with uncured or partially cured composite plies of another composite component (e.g., a composite laminate or another sandwich structure) for subsequent co-curing to form a unitized composite assembly 200 without the use of fasteners and/or adhesive at least in the interfacial region 256.

FIG. 4 is a flowchart illustrating one or more operations that may be included in an example of a method 400 of fabricating a composite assembly 200. Step 402 of the method 400 may include laying up a plurality of first composite plies 204 to form a first layup 202. Step 404 of the method 400 may include laying up a plurality of second composite plies 214 to form a second layup 212. Although the presently-disclosed method is described in the context of assembling two composite laminates to form a unitized composite assembly 200, the method may be applied in an iterative manner to assemble any number of composite laminates to form a unitized composite assembly 200, as described below.

In the present example, the first composite plies 204 of the first layup 202 and/or the second composite plies 214 of the second layup 212 may be formed of fiber-reinforced polymer matrix material. The composite plies may be comprised of fibers that may be pre-impregnated with resin (e.g., prepreg). The fibers in the prepreg composite plies may be provided in any one of a variety of different fiber forms including continuous fibers such as in unidirectional tape or unidirectional sheet. The composite plies may also be provided as woven fabric (e.g., bidirectional fibers) composite plies, braided fibers, chopped fibers plies, stitched fiber forms, or any one of a variety of other fiber forms.

For unidirectional tape or sheet, the fibers in the composite plies of a layup may be arranged in any one of a variety of different fiber orientations (e.g., 0, 22.5, 30, 45, 60, 75, 90 degrees or other fiber angles). In one example, the method may include laying up the composite plies to form a quasi-isotropic composite laminate containing 0-degree, ±45-degree, and 90-degree plies. The composite plies in each of a first and second layup 202, 212 may be stacked according to a predetermined stacking sequence to achieve the desired strength and stiffness properties of the final composite assembly 200.

The material from which the fibers may be formed may include aramids, polyolefins, metal, glass, carbon, boron, ceramic, mineral, and any one of a variety of other materials or combination of materials. The resin may be provided in any one of a variety of material compositions including, but not limited to, acrylics, epoxies, fluorocarbons, polyamides, polyethylenes, polyesters, polypropylenes, polycarbonates, polyurethanes, polyetheretherketones, polyetherketoneketones, polyetherimides, bismaleimides, and other material compositions. Although the present method is described in the context of prepreg composite plies formed of thermosetting resin, in some examples, the prepreg composite plies may include thermoplastic resin. In this regard, the below-described steps of curing the individual layups, and the steps of integrally co-curing the uncured sections of the assembled laminates may encompass solidification of the thermoplastic resin of prepreg thermoplastic plies.

Step 406 of the method 400 may include individually curing the first and second layup 202, 212 in a manner forming a respective first and second laminate 206, 216. In this regard, the first layup 202 may be cured in a manner to form a first laminate 206 having a first cured section 208 and a first uncured section 210. Likewise, the second layup 212 may be cured in a manner to form a second laminate 216 having a second cured section 218 and a second uncured section 220.

FIG. 5 is a plan view of a first laminate 206 and a second laminate 216 which may be separately laid up and cured. The first laminate 206 and the second laminate 216 are both shown as layups each having one 0-degree ply 244, a pair of 90-degree plies 246, and one 45-degree ply 248. The stacking sequence of the first laminate 206 may be complementary (e.g., equivalent) to the stacking sequence of the second laminate 216. The first laminate 206 has a first cured section 208 and a first uncured section 210. The second laminate 216 has a second cured section 218 and a second uncured section 220. In the example shown, the cured section of each laminate may have a longer length than the uncured section. However, the cured section and the uncured section of a laminate may be provided in any proportion, and are not limited to the cured section being longer or larger than the uncured section. The step of curing a layup may include consolidating, compacting, and/or de-bulking the layup or any portion of the layup. For example, the cured section and the uncured section of a layup may be simultaneously compacted or debulked prior to or during the curing of the portion of the layup defining the cured section.

The uncured section of one or both of the laminates may be completely uncured such that the uncured section is in the green state. Alternatively, the uncured section of one or both of the laminates may be advanced to a low cure state relative to full cure, such as to a cure state of less than 10 percent, such as to a low cure state of approximately 5 percent. Partially curing an uncured section (e.g., 5 percent) may reduce or eliminate tack from the composite plies in the uncured section and/or may increase the stiffness of the composite plies in the uncured section by increasing the glass transition temperature of the resin in the laminate. Reducing or eliminating tack and/or increasing the stiffness of the composite plies in the uncured sections may facilitate the interleaving of the composite plies during the step of assembling the laminates prior to curing the interfacial region 256.

Step 408 of the method 400 may include interleaving the first composite plies 204 in the first uncured section 210 with the second composite plies 214 in the second uncured section 220 to form the interfacial region 256. For example, the method may include inserting at least one of the first composite plies 204 in the first uncured section 210 between a pair of the second composite plies 214 in the second uncured section 220 to form the interfacial region 256. FIG. 6 is a top view of the assembled first and second laminate 206, 216 wherein the first uncured section 210 is interleaved with the second uncured section 220 to form the interfacial region 256.

Step 410 of the method 400 may include curing the interfacial region 256 to join the first laminate 206 to the second laminate 216 and form a unitized composite assembly 200, as described in greater detail below. Although the interfacial region 256 may be cured with the composite assembly 200 positioned inside of an autoclave, the curing of the interfacial region 256 may also be performed without the use of an autoclave. For example, out-of-autoclave curing of the interfacial region 256 may be performed using an oven or a press clave 332 (FIG. 12), or using a vacuum bag 320 (FIG. 12) and thermal pads and/or thermal blankets, heat lamps, radiation heating, or other devices and techniques for locally applying heat 336 and compaction pressure 334 for curing the interfacial region 256.

FIG. 7 is a sectional view of the interfacial region 256 of FIG. 6 after curing the first uncured section 210 and second uncured section 220 to full cure. As can be seen, a first composite ply 204 on the bottom of the ply stack is interleaved between a pair of the second composite plies 214. Butt joints 264 are formed between the first and second composite plies 204, 214 in the middle of the ply stack. Although the butt joints 264 are shown as vertically aligned with another, the butt joints 264 may preferably be staggered relative to one another and may also be staggered relative to the remaining joints in the interfacial region 256 as a means to avoid an accumulated build-up of splices or joints which may create a bump or ridge (not shown) in the joined composite assembly 200 (FIG. 6). In FIG. 7, on top of the ply stack, the second composite ply 214 forms an overlap joint 262 with the first composite ply 204 which is shown staggered from the remaining joints in the interfacial region 256.

FIG. 8 shows an example of a first layup 202 including a plurality of first composite plies 204. The first composite plies 204 are laid up on a layup cure tool 250. The present method may include inserting a ply separator 252 between at least one adjacent pair of the first composite plies 204 and/or between at least one adjacent pair of the second composite plies 214 of the respective first and second laminate 206, 216 prior to interleaving and prior to initially curing the first and second cured section 208, 218. The method may include removing the ply separators 252 prior to interleaving the first and second composite plies 204, 214 and curing the interfacial region 256. As described below, the ply separators 252 may advantageously prevent resin of adjacent composite plies in the first and/or second uncured section 210, 220 from intermingling and bonding with one another during curing of the first and/or second cured section 208, 218. The ply separators 252 may be formed of any material that is not chemically reactive with the resin in the composite plies. In one example, the ply separators 252 may be formed of fluorinated ethylene propylene (FEP).

Figure 9:
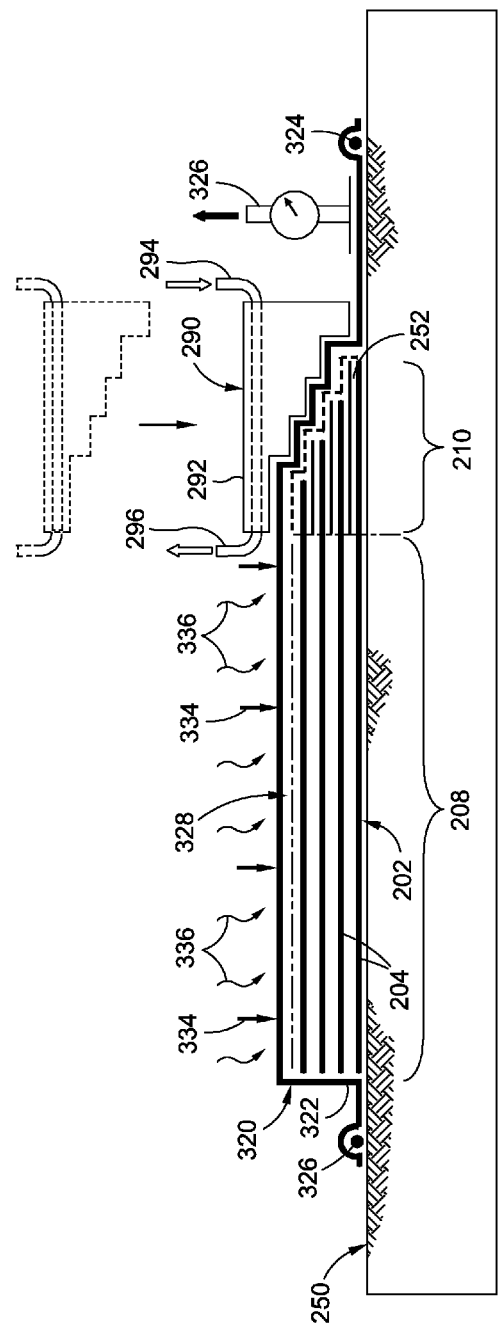
FIG. 9 is a diagrammatic representation of a side view showing the application of heat and compaction pressure to the first cured section of the first laminate and illustrating a temperature control device positioned over the first uncured section of the first laminate to prevent curing thereof during the curing of the first cured section.

FIG. 9 is a sectional view of a vacuum bag 320 applied over the first layup 202 for consolidating, compacting, and/or debulking the first layup 202, and for curing the cured section 208 of the first layup 202. The second layup 212 may be processed and cured in a manner similar to the first layup 202 as described herein. In FIG. 9, the vacuum bag 320 may include a non-porous or impermeable bagging film 322 which may be sealed to the layup cure tool 250 around a perimeter of the first layup 202 using edge sealant 324 such as sealant tape. The vacuum bag 320 may include at least one vacuum port 326 that may be coupled to a vacuum source (not shown) such as a vacuum pump or vacuum generator for generating vacuum pressure within the bagging film 322. Additional layers such as a release layer (not shown) and one or more breather layers 328 may be included between the first layup 202 and the bagging film 322. Application of vacuum pressure to the vacuum bag 320 may cause the application of compaction pressure 334 onto the first layup 202 against the layup cure tool 250. The application of compaction pressure 334 may facilitate the removal of air and/or other gases during curing of the first layup 202 and may facilitate consolidation of the first layup 202 to prevent the occurrence of porosity or voids and thereby improve the fiber volume fraction of the composite laminate.

FIG. 9 illustrates the application of heat 336 and compaction pressure 334 to the first layup 202. In this regard, the method may include individually heating a respective portion of the first and second layup 202, 212 defining the respective first and second cured section 208, 218, and preventing the heating of the respective first and second uncured section 210, 220 during curing of the first and second layup 202, 212. In this manner, the respective first and second laminate 206, 216 may be formed having a respective first and second cured section 208, 218 and a respective first and second uncured section 210, 220. The application of compaction pressure 334 to the respective first and second layup 202, 212 may facilitate the consolidation and/or de-bulking of the respective first and second composite plies 204, 214 prior to or simultaneous with the curing of the resin in the respective first and second cured section 208, 218. As indicated above, the compacting or debulking of the first and second uncured section 210, 220 may occur while respectively curing the first and second cured section 208, 218.

FIG. 9 additionally illustrates a temperature control device 290 positioned adjacent to the first uncured section 210 of the first layup 202 to prevent the curing of the first uncured section 210 during the curing of the first cured section 208. The temperature control device 290 may be configured to control the temperature of the first uncured section 210 and thereby prevent heating of the first and second uncured section 210, 220 (e.g., above a predetermined temperature threshold) when respectively curing the first and second cured section 208, 218. In some examples, the temperature control device 290 may be positioned in direct contact with the first uncured section 210 and may be configured to maintain the temperature of the first uncured section 210 below a predetermined value. In the example shown, the temperature control device 290 may be configured as a cooling jacket 292 configured to conform to the first uncured section 210 and circulate cooling fluid through the cooling jacket 292. For example, the cooling jacket 292 may include a fluid inlet 294 and a fluid outlet 296 which may be fluidly coupled via one or more hoses to a fluid reservoir (not shown) containing cooling fluid. For applications where the layup is cured inside of an autoclave, the fluid reservoir may optionally be located outside of the autoclave and one or more hoses or fluid conduits may carry fluid to and from the cooling jacket 292.

As may be appreciated, the temperature control device 290 may be provided in any one of a variety of different configurations for absorbing or rejecting heat in an uncured section of a layup during curing of the cured section of the layup. In some examples, the one or more heat sinks or cooling jacket 292 may be positioned directly on top of the vacuum bag 320 covering an uncured section. One or more cooling jackets 292 may also be positioned directly underneath and in direct contact with an uncured section. Although not shown, a system may optionally be included for monitoring the temperature of the fluid exiting the fluid outlet 296. Such a system may be capable of adjusting the temperature and/or the flow rate of fluid entering the fluid inlet 294 as a means to maintain a local temperature of an uncured section below a predetermined value.

As may be appreciated, other methods may be implemented for actively or passively controlling the temperature of an uncured section during curing of a cured section of a layup. For example, the temperature of an uncured section may be controlled by reducing heat flow into the uncured section such as by locally increasing the thickness of the breather layer in the portion of the vacuum bag covering the uncured section as a means to reduce heat conduction into the uncured section. Additional methods may include the use of an airflow barrier (not shown) or a box structure (not shown) at least partially enclosing or surrounding an uncured section to reduce (or prevent) heat conduction into the uncured section. The method may also include locally increasing the thermal mass (e.g., the tool volume) of the cure layup tool in the location immediately below the uncured section to facilitate heat absorption locally into the cure layup tool in the area below the uncured section, and thereby reducing heat input into the uncured section. Air pockets (not shown) may also be incorporated into the cure layup tool to decrease thermal conductivity into the uncured section. Pockets containing phase change material may also be incorporated into the cure layup tool for locally increasing the latent heat of the layup cure tool 250 at specific temperatures or temperature ranges.

FIG. 10 is a side view of a first laminate 206 and a second laminate 216 following the curing of the respective first and second cured section 208, 218. The ply separators 252 are shown inserted between the respective first and second composite plies 204, 214. The ply separators 252 may be positioned such that the ends of each ply separator 252 terminate at the boundary of the respective first and second uncured section 210, 220. A portion of the ply separators 252 may protrude to allow removal of the ply separators 252 prior to assembling the first and second laminate 206, 216 and curing the interfacial region 256.

FIG. 11 shows the first and second laminate 206, 216 of FIG. 10 following the removal of the ply separators 252 and prior to the assembly of the first and second laminate 206, 216. The first and second laminate 206, 216 may be co-designed such that the first composite plies 204 may be interleaved with the second composite plies 214 in a desired manner. In this regard, the first and second laminate 206, 216 may be may be co-designed such that the ply ends 222 of the first and second composite plies 204, 214 are terminated at complementary locations such that the desired ply joint 260 configuration may be formed between the first and second composite plies 204, 214 when the first and second laminate 206, 216 are assembled.

FIG. 12 shows the first and second laminate 206, 216 assembled on an interfacial region cure tool 266, and illustrates the interleaving of one of the first composite plies 204 between a pair of the second composite plies 214. The method may include supporting the interfacial region 256 on the interfacial region cure tool 266. The remainder of the first laminate 206 and the second laminate 216 (e.g., the first and/or second cured section 208, 218) may be unsupported by the interfacial region cure tool 266, and instead may be supported by one or more simple laminate supports 268, or in another manner that does not require full tooling along the length of the composite assembly 200.

The presently-disclosed method includes interleaving the first composite plies 204 in the first uncured section 210 with the second composite plies 214 in the second uncured section 220 to form the interfacial region 256. The ply separators 252 may be removed prior to assembly of the first and second laminate 206, 216. As mentioned above, the ply separators 252 may allow the individual first and second composite plies 204, 214 to be splayed apart to facilitate partial insertion of the mating composite plies during initial assembly of the mating laminates.

During the assembly of the first and second laminate 206, 216, the present method may include at least partially overlapping at least one of the first composite plies 204 of the first uncured section 210 with at least one of the second composite plies 214 of the second uncured section 220 within the interfacial region 256. In the example shown, the ply end 222 of the bottom first composite ply 204 may overlap the bottom second composite ply 214 by a predetermined amount to facilitate load transfer from the first laminate 206 to the second laminate 216. The ply end 222 of the first composite ply 204 may overlap the second composite ply 214 by a distance of at least 0.5 inch to allow for load transfer between the composite plies. However, interleaved plies 254 may overlap by a distance less than 0.5 inch and still may provide the capability to transfer loads between the interleaved plies 254.

In FIG. 12, the two middle composite plies in the ply stack are each shown forming a butt joint 264. In the presently-disclosed method, the first composite plies 204 and the second composite plies 214 may each include non-0-degree plies having fibers oriented non-parallel to a primary load direction of the composite assembly 200. The interleaving of the composite plies may include butting at least one of the non-0-degree plies in the first uncured section 210 of the first laminate 206 with at least one of the non-0-degree plies in the second uncured section 220 of the second laminate 216.

In some examples, the ply ends 222 of the first layup 202 and the second layup 212 may be terminated to provide a predetermined gap at each butt joint 264. For example, the first and second layup 202, 212 may be arranged such that when the first and second laminate 206, 216 are assembled, the butt joint 264 between the ply end 222 of a first composite ply 204 and a corresponding second composite ply 214 provides a gap of less than 0.25 inch between the ply ends 222. In other examples, the gap in a butt joint 264 between the ply ends 222 may be less than 0.10 inch. Load transfer across each butt joint 264 (e.g. from a first composite ply 204 to a second composite ply 214) may be provided by the composite plies immediately above and/or below the butt joint 264.

For the laminates shown in FIG. 12, the first composite plies 204 and the second composite plies 214 each include 0-degree plies 244 wherein the fibers are oriented parallel to a primary load direction. The step of interleaving the first and second composite plies 204, 214 may include overlapping at least one of the 0-degree plies 244 in the first uncured section 210 of the first laminate 206 with at least one of the 0-degree plies 244 in the second uncured section 220 of the second laminate 216 to form an overlap joint. However, non-0-degree plies 244 may also include overlap joints 262.

FIG. 12 shows an overlap joint 262 formed by the overlap of the top second composite ply 214 over the first composite ply 204. In an overlap joint, the first and second ply layups may be arranged such that a composite ply may overlap another composite ply by a distance of at least 0.5 inch to allow for load transfer between the composite plies, although smaller overlaps may be provided. The overlap joints 262 and the interleaved plies 254 allow for load transfer across the 0-degree plies 244 of the first composite laminate and the second composite laminate.

The first and second laminate 206, 216 may be positioned and assembled on the interfacial region cure tool 266 which may be provided in a size, shape, and configuration to support the interfacial region 256 during curing of the interfacial region 256 to join the first laminate 206 to the second laminate 216 to form a unitized composite assembly 200. The interfacial region cure tool 266 may extend slightly (e.g., several inches) beyond the boundaries of the respective uncured section 210, 220 of the first and second laminate 206, 216 and into a portion of the first and second cured section 208, 218 to avoid mark-off that may otherwise occur on the underside of the first and second uncured section 210, 220 if the interfacial region cure tool 266 were terminated short of the edge of the respective first and second cured section 208, 218. The cured section 208, 218 of each one of the first and second laminates 206, 216 may be supported by one or more simple laminate supports 268, thereby avoiding the need for the final cure tool extending the complete length and width of the unitized composite assembly 200.

One or more heating mechanisms may be implemented for locally heating the interfacial region 256. For example, one or more localized heating devices 330 may be applied over the interfacial region 256. One or more localized heating devices 330 may also be included for direct heating of the interfacial region cure tool 266 (e.g., using heating elements such as resistive wires embedded in the cure tool) for applying heat 336 for curing the interfacial region 256. In addition, one or more pressure-application mechanism may be implemented for applying compaction pressure to the interfacial region 256. For example, a press clave 332 may be applied over the interfacial region 256 to apply heat 336 and compaction pressure 334 to the interfacial region 256 for out-of-autoclave curing. Alternatively, a double-vacuum-bag de-bulking assembly (not shown) may be applied over the interfacial region 256 for applying compaction pressure 334 to the interfacial region 256 in an out-of-autoclave process.

In some examples, a traditional vacuum bag 320 may be implemented for applying compaction pressure 334 for a composite layup formed of resin that is formulated for curing at less than 1 atmosphere of pressure such as in an out-of-autoclave curing process. However, the composite assembly 200 may be of a small enough size to fit inside an autoclave such that the interfacial region 256 may be supported on the interfacial region cure tool 266 and vacuum bagged for applying increased compaction pressure 334 to the interfacial region 256 while heating the interfacial region 256 using autoclave heating.

In any of the above-described curing examples, the step of curing the interfacial region 256 may include heating the interfacial region 256, and preventing the heating of the portion of the layup defining the first and second cured section 208, 218 when heating and curing the interfacial region 256. In this regard, one or more temperature control devices 290 may be applied to or positioned on (e.g., above and/or below) the first and/or second cured section 208, 218 to prevent excessive heating of such sections during curing of the interfacial region 256. For example, the above-described cooling jackets 292 may be positioned directly on top of the first and second cured section 208, 218. Cooling fluid such as water may be circulated through the cooling jackets 292 in a manner described above to maintain the temperature of the first and/or second cured section 208, 218 below a predetermined value.

FIG. 13 shows an example of the assembly of a first laminate 206 and a second laminate 216 wherein all of the first composite plies 204 and second composite plies 214 may be interleaved. The first and second layup 202, 212 may be arranged such that the ply ends 222 of the first composite plies 204 overlap the ply ends 222 of the second composite plies 214 by the same amount in each one of the overlap joints 262.

FIG. 14 additionally shows the overlap joints 262 in the ply stack being staggered within the interfacial region 256 as a means to avoid an accumulated build-up of joints or splices in the interfacial region 256. In some examples, the presently-disclosed method includes staggering at least two ply joints 260 in the ply stack joining the first and second laminate 206, 216. In this regard, the first and second laminate 206, 216 may be configured such that two or more of the overlap joints 262 are non-staggered resulting in the ply joints 260 being vertically aligned with another. In other examples, all of the joints may be staggered relative to one another within the interfacial region 256. Staggering the ply joints 260 may be preferred as a means to avoid localized increases in the thickness of the composite laminate.

FIG. 15 shows a top view of a 45-degree ply 246 as may be included in one of the first composite plies 204 or second composite plies 214 of a respective first and second laminate 206, 216. A 45-degree ply 246 may be formed of courses of unidirectional tape 242 arranged parallel to another such that the tape sides of the unidirectional tape 242 are in abutting contact with one another. The tape ends 243 of the unidirectional tape 242 may be cut perpendicular to the tape sides to simplify the tape layup process. For example, by cutting the tape ends 243 perpendicular to the tape sides, an automated tape laying machine 284 (ATLM) (see FIG. 21) may avoid the need to make unique angled cuts at each tape end, which may reduce the amount of time required to lay up a composite ply. In this regard, for any layup wherein at least one of the composite plies is a non-0-degree ply or a non-90-degree ply (e.g., a +/−45-degree ply 246) formed of unidirectional tape 242 with perpendicular tape ends 243, a crenulated edge 240 may result along one or more sides of the composite ply, such as along a side of the first uncured section 210 and/or the second uncured section 220, as shown in FIG. 15.

FIG. 16 shows the assembly of the first and second laminate 206, 216 of FIG. 15 joined in the interfacial region 256 and illustrating the interleaving of the tape ends of the unidirectional tape 242. In the presently-disclosed method, the step of interleaving the first and second laminate 206, 216 may include inserting the tape ends of the unidirectional tape 242 of the first composite ply 204 between a pair of the second composite plies 214. The tape end of the 45-degree first composite ply 204 may overlap the tape end of a 45-degree second composite ply 214. However, a second composite ply 214 with a different fiber orientation (e.g., a non-45-degree ply) may overlap the 45-degree first composite ply 204.

FIG. 17 is a sectional view showing the interfacial region 256 of FIG. 16 and illustrating the tape end 243 of the first composite ply 204 sandwiched between a pair of the second composite plies 214. The distance along which the tape ends 243 overlap may be similar to overlap distances described above with regard to the overlap joints 262 illustrated in FIG. 12. Although not shown, two or more of the joints within the interfacial region 256 may be staggered. For example, if one of the layers (e.g., layer 3) is a 45-degree ply 248 having a crenulated overlap joint 262, and another layer (e.g., layer 5) is a 45-degree ply 248, then the overlap joint 262 of the two 45-degree plies may be staggered relative to one another and relative to other layers to avoid a local build-up in thickness which may otherwise result in a bump or ridge in the composite assembly 200.

FIG. 18 shows an embodiment of the first and second laminate 206, 216 configured to be joined using a composite splice 280 for splicing together the first and second composite plies 204, 214 within the interfacial region 256. The first and second layup 202, 212 may be separately laid up such that the ply ends 222 terminate in a staggered arrangement. Ply separators 252 may be inserted between one or more adjacent pairs of the first and second composite plies 204, 214 within the respective first and second uncured section 210, 220 to prevent bonding between the composite plies during initial curing of the cured section 208, 218.

FIG. 19 shows the first and second laminate 206, 216 of FIG. 18 following the removal of the ply separators 252. FIG. 20 shows the first and second laminate 206, 216 assembled together and illustrating one of the first composite plies 204 of the first laminate 206 interleaved with a pair of immediately adjacent second composite 214 of the second laminate 216. A butt joint 264 may be formed between the ply located above the interleaved ply 254. The remaining plies may have increasingly wider gaps between the ply ends 222 of the first and second composite plies 204, 214 to accommodate the ramp angle in the splice plies 282 of the composite splice 280 (discussed in connection with FIG. 21).

FIG. 21 is a side view of the first and second laminate 206, 216 of FIG. 20 illustrating the step of laying one or more splice plies 282 over the first composite plies 204 and the second composite plies 214 in the interfacial region 256. The composite splice plies 282 may be laid up manually or in an automated manner such as with an automated tape laying machine 284 (ATLM). However, other automated processes (e.g., fiber placement, filament winding) may be implemented for laying up splice plies 282 within an interfacial region 256. Regardless of the manner of layup, the step of laying up one or more splice plies 282 may include overlapping at least one of the splice plies 282 over at least one of the first composite plies 204 and over at least one of the second composite plies 214.

A plurality of the composite splice plies 282 may be laid up over the first and second composite plies 204, 214 in the interfacial region 256 to form a composite splice 280 for splicing together the first and second laminate 206, 216. The first and second layup 202, 212 may be configured such that the tape ends 243 terminate in a manner resulting in a tapering of the stack of splice plies 282. In this regard, the tape ends 243 of the first and second layup 202, 212 may be staggered such that each one of the composite splice plies 282 overlaps the first composite plies 204 and/or the second composite plies 214 with a ramp rate of greater than 1:1. The ramp rate may be designed to avoid stress concentrations that would otherwise occur if all of the overlap joints 262 between the splice plies 282 and the first and second composite plies 204, 214 occurred in approximately the same location.

In some examples, the first and second layup 202, 212 may be configured such that the layup of the splice plies 282 may provide a ramp rate of greater than 20:1, such as a ramp rate of approximately 30:1. The distance along which each splice ply 282 overlaps a first composite ply 204 and a second composite ply 214 may be similar to the overlap distance described above with regard to the overlap joints 262 of FIG. 12. In one example, an overlap joint 262 may allow for approximately 0.25 inch of overlap between a splice ply 282 and a first composite ply 204 and between the splice ply 282 and a second composite ply 214. However, any amount of overlap may be provided in an overlap joint 262, including an overlap of up to 0.50 inch or more.

FIG. 22 shows the assembly of the first and second laminate 206, 216 on an interfacial region cure tool 266. The interfacial region cure tool 266 may be sized and configured similar to that described above with regard to the interfacial region cure tool 266 shown in FIG. 12. The majority of the first cured section 208 and/or the second cured section 218 may be generally unsupported by the interfacial region cure tool 266, and instead may be supported by simple laminate supports 268. Any one of the heating mechanisms and/or pressure-application mechanism described above with regard to FIG. 12 may be implemented for locally heating and applying compaction pressure 334 to the composite splice 280 and the first and second uncured section 210, 220 in the interfacial region 256 in FIG. 22. In this regard, the method may include co-curing the splice plies 282 and the uncured sections 210, 220 of the first and second composite plies 204, 214 in the uncured sections 210, 220 for forming a unitized composite assembly 200 of the first and second laminate 206, 216.

FIG. 23 is a perspective view of a horizontal stabilizer 104. The horizontal stabilizer 104 may be representative of a composite structure having complex geometry and which is designed to be formed as a single, integrated, unitized composite assembly 200. In the example shown, the horizontal stabilizer 104 is a closed box structure having an outer composite skin 106 supported by and enveloping a plurality of internal composite components such as composite spars 110.

FIG. 24 is an end view of the horizontal stabilizer 104 taken along line 24 of FIG. 23 showing the internal components 108 as three composite spars 110 positioned within the interior of the horizontal stabilizer 104 defined by the skin 106. In the example shown, each one of the composite spars 110 has a C-shaped cross-section. Each C-shaped cross-section includes a web 112 interconnecting a pair of flanges 114 that interface with the skin 106.

It should be noted that although the present disclosure describes a method for interleaving and co-curing C-shaped composite spars 110 with the composite plies of an outer skin 106 of a horizontal stabilizer 104, the presently-disclosed method may be implemented for interleaving and co-curing composite structures of any size, shape, and configuration, without limitation. Further in this regard, the presently-disclosed method is not limited to interleaving and co-curing closed box structures, and may extend to interleaving and co-curing non-closed structures such as flat and/or curved panels that may be may be interleaved and co-cured with one or more composite structures such as stringers, stiffeners, spars, clips, brackets, doublers, or any other type of composite structure.

Even further, the method may include interleaving an additional uncured section of one additional layup (or more) with the first and second laminate 206, 216. For example, the first and second uncured section 210, 220 of the respective first and second laminate 206, 216 may be interleaved and the resulting interfacial region 256 may be integrally co-cured with a third uncured section of a third laminate (not shown). In this regard, any number of composite laminates may be interleaved and the resulting interfacial region 256 may be integrally co-cured using the method disclosed herein FIG. 25 is an end view of one of the spars 110 of FIG. 24 showing the web 112 and flanges 114, and radii 116 of the spar 110. In the example shown, the web 112 may comprise a first cured section 208 of the spar 110, and the flange 114 and radius 116 on each side of the web 112 may each comprise a first uncured section 210 of the spar 110. As described below, the spar 110 may be provided such that the web 112 is completely cured and the flange 114 and radius 116 on opposite sides of the web 112 may be provided in an uncured state or in a partially cured state (e.g., less than 10 percent of full cure). In addition, the skin 106 of the horizontal stabilizer 104 may be provided in an uncured state (e.g., a green state). Alternatively, the regions of the skin 106 that interface with the flanges 114 may be partially cured to a relatively low cure state (e.g., less than 10 percent of full cure) to facilitate the interleaving of the skin 106 with the flanges 114.

FIG. 26 shows the layup of composite plies on a layup cure tool 250 for laying up and curing the composite spar 110. One of more ply separators 252 may be included between at least one pair of the composite plies. The ply separators 252 may be inserted to any depth within the uncured sections. As indicated above, each uncured section of a spar may include the flange and may additionally include the radius and potentially a portion of the web. The ply separators 252 may be partially inserted into the uncured section of the flange 114, or the ply separators 252 may be inserted into the flange 114 and the radius 116 up to the point where the radius 116 transitions to the web 112. As indicated above, the ply separators 252 may prevent bonding of adjacent composite plies during the curing of the cured section of the spar (e.g., the web 112). The ply separators 252 may allow the composite plies to be splayed apart to facilitate insertion of one or more of the skin 106 composite plies.

FIG. 27 illustrates the vacuum bagging of the composite spar 110 on the layup cure tool 250 for curing the first cured section 208 (e.g., the web). A pair of temperature control devices 290 may be positioned over each one of the first uncured sections 210 (e.g., each flange 114 and corresponding radius 116) to prevent curing of the uncured sections. As indicated above, the uncured sections may be completely uncured or may be advanced to a partial cure state such as to less than 10 percent of full cure. In one example, the uncured section may be advanced to a cure state of approximately 5 percent.

In any one of the examples disclosed herein, an uncured section may be partially cured such that the glass transition temperature ($T_g$) of the uncured section is above room temperature (e.g., roughly 70 degrees F.) causing the resin to become glassy and resulting in an increase in rigidity of the composite plies in the uncured section. In the case of the spar 110 shown in FIG. 27, the increased rigidity of the uncured section of the flange 114 and radius 116 composite plies may facilitate interleaving of the flange 114 composite plies with the skin 106 composite plies. In addition, partially curing an uncured section may reduce or eliminate tack in the uncured section of the composite plies which may also facilitate interleaving of the composite plies.

In some examples, a computer modeling tool may be implemented for predicting the local temperature profile of a composite laminate during curing of the composite laminate in a heated environment such as in an oven or an autoclave. Such a computer modeling tool may allow for predicting the advancement of the cure state of the composite laminate during a prescribed cure temperature profile. In this manner, the temperature and time parameters of the composite laminate may be monitored to achieve a limited amount of resin cure in the uncured section while enabling full cure of the cured section.

Figure 28:
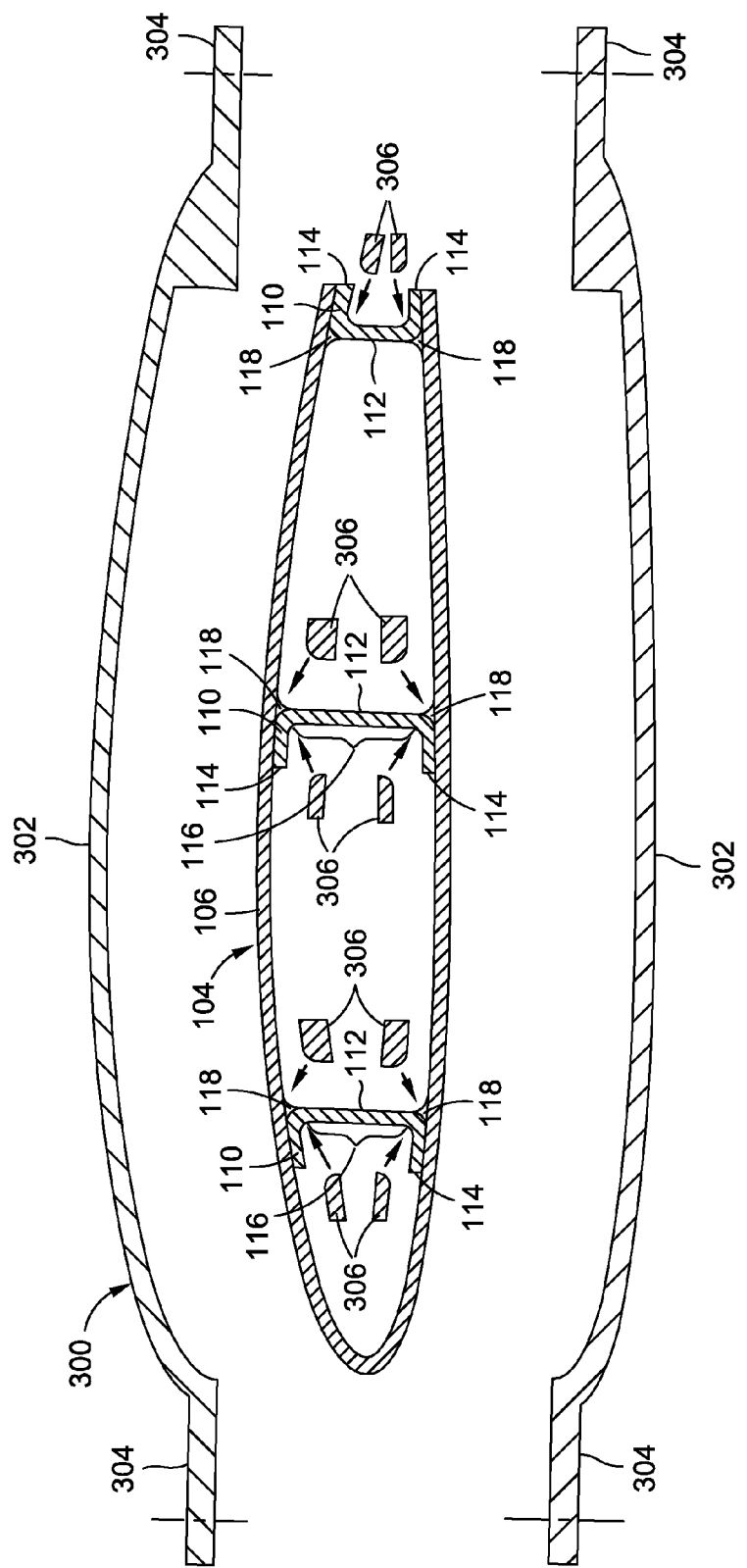
FIG. 28 is a diagrammatic representation of a side view of the spars and the skin of the horizontal stabilizer positioned between a pair of outer mold line (OML) tool halves of an OML tool, and further illustrating a plurality of radius tools positioned on opposite sides of each flange of each spar.

FIG. 28 is a side view of the composite spars 110 and the composite skin 106 of the horizontal stabilizer 104 positioned between a pair of outer mold line (OML) tool halves 302. A plurality of radius tools 306 may be positioned on opposite sides of each flange 114 and corresponding radius 116. The radius tools 306 may facilitate the localized application of compaction pressure 334 onto the radii 116, the flanges 114, and the skin 106 during curing.

FIG. 29 is a perspective view of an example of the OML tool 300 comprised of the pair of OML tool halves 302. The OML tool halves 302 may each have tool flanges 304 for joining the OML tool halves 302 along seams on opposite sides of the OML tool 300. The OML tool 300 may be implemented for consolidating and curing the composite assembly 200 of spars 110 and skins 106 against the inner surface of the OML tool 300 to form a horizontal stabilizer 104 as a unitized composite assembly 200.

FIG. 30 is a sectional view of the OML tool 300 showing the assembly of composite spars 110 and composite skin 106. As indicated above, the web 112 portion of each composite spar 110 may be fully cured prior to assembly of the spar 110 inside the skin 106. The skin 106 may be provided in an uncured state. Alternatively, a majority of the skin 106 may be fully cured with the exception of the regions of the skin 106 that are to be interleaved and/or integrally co-cured with the uncured sections of the composite spars 110.

Figure 31:
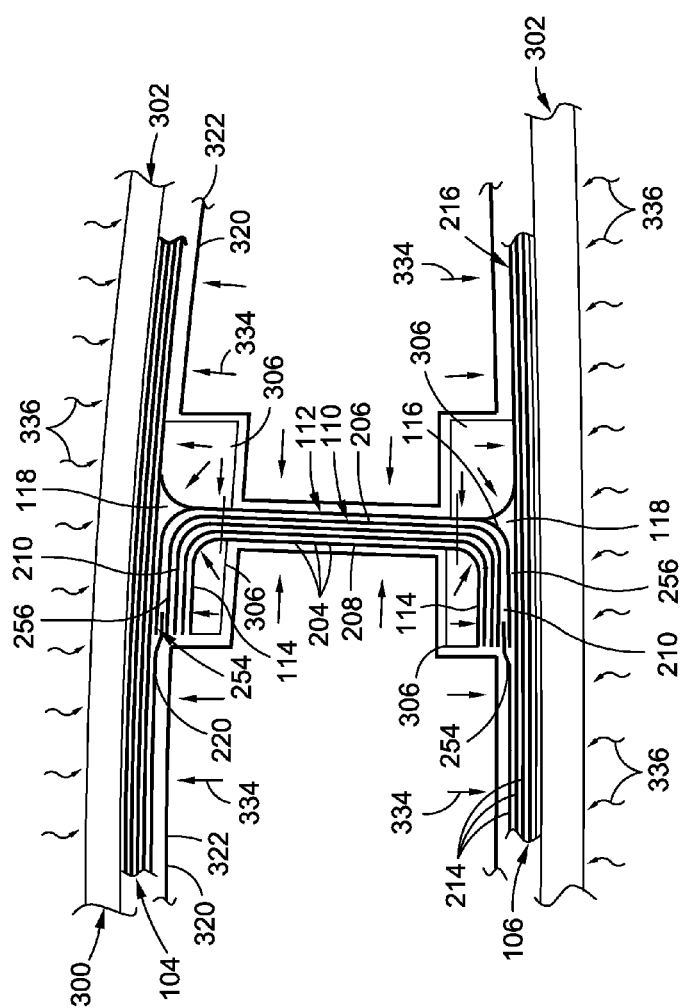
FIG. 31 is a diagrammatic representation of a magnified view of a portion of the composite assembly of FIG. 30 illustrating the composite plies of the horizontal stabilizer skin interleaved with the composite plies of one of the spars and further illustrating the radius tools applying compaction pressure to the uncured section of the spars during curing.

FIG. 31 shows the composite plies of the skin 106 interleaved between a pair of the composite plies of the opposing flanges of one of the spars 110. As indicated above, ply separators 252 may be initially installed between one or more of the composite plies of the flange 114 (e.g., the uncured section) prior to curing of the web 112 (e.g., the cured section) to prevent the flange 114 composite plies from bonding to one another such that the composite plies may be splayed apart during assembly of the spars 110 and skin 106.

FIG. 31 illustrates a radius filler 118 that may be installed along the length of the upper flange 114 and lower flange 114 of each spar 110 on the back side of each flange 114. After locating the radius tools 306 on each side of each flange 114 as shown, a vacuum bag 320 may be installed in each bay of the spar/skin assembly. A bay may be described as the area surrounded by a pair of spars 110 and the upper and lower skin 106 surfaces. A vacuum bag 320 may also be located within a located between the aft spar 110 and the mated OML tool halves 302 along the OML tool seam.

Vacuum pressure may be applied to the vacuum bags 320 causing compaction pressure 334 to be applied to the skin 106 against the inner surface of the OML tool 300. In addition, the vacuum bag 320 may apply pressure to the radius tools 306 which may in turn apply compaction pressure 334 to the uncured section of the flanges 114 and radius 116 of the spars 110. Heat may be applied to the uncured sections of the spar and skin via heating of the OML tool 300. For example, the OML tool 300 may be positioned within an autoclave or oven. The heat from the OML tool 300 may heat the skin 106 which, in turn, may heat the uncured flanges 114 and radii 116 of each spar 110 and allow for consolidation and final cure of the spars 110 and skin 106.

Figure 32:
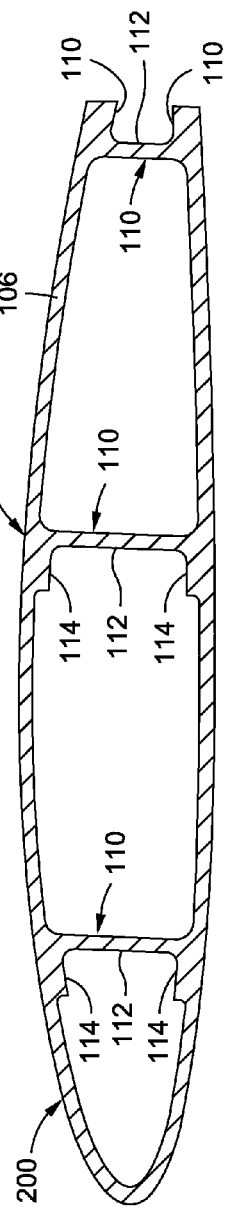
FIG. 32 is a diagrammatic representation of a sectional view of a unitized composite assembly of a horizontal stabilizer formed by co-curing the uncured sections of the spars with the skin.

Advantageously, the pre-curing of the webs 112 of each spar 110 may reduce the distance along which the heat must be conducted to fully cure the flanges and radii of the spars. The composite assembly may also be heated using heating elements, radiation heating, or any other type of heating. After curing is complete, the vacuum bag 320 and the radius tools 306 may be removed from the interior of the horizontal stabilizer 104. The OML tool halves may be separated to allow for removal of the unitized horizontal stabilizer 104 shown in FIG. 32.

Advantageously, the presently-disclosed method reduces the fastening and/or bonding that may otherwise be required for coupling composite parts. The reduction in fastening and/or bonding may allow for a reduction in the number of surfaces that have tight dimensional tolerances as may be required for fastening and/or adhesively bonding such composite parts. As may be appreciated, a reduction in the quantity of fasteners, a reduction in bonding, and a reduced requirement for tight dimensional tolerances may translate into a reduction in the cost and time associated with tooling design, part assembly, and part inspection. A reduced requirement for tight dimensional tolerances may also reduce or avoid the need to design tooling to accommodate part warpage that may occur as a result of composite part cure. In addition, a reduction in fasteners may result in a reduction in the weight of the cured composite assembly.

A further advantage associated with reducing or avoiding the use of fasteners in composite assemblies is an improvement in the laminate mechanical properties. For example, certain composite structures may be designed based on the open-hole-compression (OHC) strength of a composite panel. OHC strength may be applied in the design of fastened structures as a means to prevent the failure of the structure in the event of a loss of a fastener. The application of OHC strength may dictate an increase in part thickness which may translate to increased structural weight. Advantageously, by joining composite parts using the integral co-curing method disclosed herein instead of using fasteners, the use of OHC strength in designing a composite assembly may be reduced or eliminated, and a less restrictive design factor may be applied which may translate into reduced structural weight. For weight-sensitive applications such as aircraft, a reduction in structural weight may translate into an improvement in operating performance of the aircraft such as increased range and/or improved fuel efficiency.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of fabricating a composite assembly, including:

providing a first laminate and a second laminate respectively formed of first and second composite plies and having a respective first and second cured section and a respective first and second uncured section;

interleaving at least one of the first composite plies in the first uncured section with the second composite plies in the second uncured section to form an interfacial region, the interleaving of the at least one of the first composite plies with the second composite plies forming an interleaved ply;

laying up one or more splice plies over the interleaved ply in the interfacial region, the splice plies being different plies from those of the first laminate and the second laminate; and curing the interfacial region to join the first laminate to the second laminate and form a unitized composite assembly.

2. The method of claim 1, wherein the step of interleaving includes:

inserting at least one of the first composite plies in the first uncured section between a pair of immediately adjacent second composite plies in the second uncured section.

3. The method of claim 1, wherein the step of curing the interfacial region includes:

heating the interfacial region; and wherein the heating of the first and second cured section is less than the heating of the interfacial region when heating the interfacial region.

4. The method of claim 1, wherein the step of interleaving includes:

at least partially overlapping at least one of the first composite plies of the first uncured section with at least one of the second composite plies of the second uncured section to form the interfacial region.

5. The method of claim 1, wherein the step of interleaving includes:

staggering at least two ply joints joining the first and second laminate.

6. The method of claim 1, wherein the first composite plies and the second composite plies each include at least one 0-degree ply, the step of interleaving including:

overlapping a 0-degree ply in the first uncured section of the first laminate with a 0-degree ply in the second uncured section of the second laminate to form an overlap joint.

7. The method of claim 1, wherein the first composite plies and the second composite plies each include at least one non-0-degree ply, the step of interleaving including:

butting a non-0-degree ply in the first uncured section of the first laminate with a non-0-degree ply in the second uncured section of the second laminate to form a butt joint.

8. The method of claim 1, wherein the step of interleaving includes:

interleaving an additional uncured section of at least one additional layup with the first and second uncured section to form the interfacial region.

9. The method of claim 1, wherein the step of laying up one or more splice plies includes:

overlapping at least one of the splice plies over a ply end of at least one of the first composite plies and over a ply end of at least one of the second composite plies.

10. The method of claim 9, wherein the step of laying up one or more splice plies includes:

laying up a plurality of splice plies over the first and second composite plies with a ramp rate of greater than 1:1.

11. The method of claim 1, wherein the step of curing the interfacial region is performed using at least one of an autoclave, a press clave, an oven, and thermal blankets.

12. The method of claim 1, wherein the step of curing the interfacial region comprises:
   supporting the interfacial region on interfacial region cure tool, a remainder of at least a portion of the first laminate and the second laminate being unsupported by the interfacial region cure tool.

13. The method of claim 1, wherein at least one of the composite plies in the first and second laminates is a non-0-degree ply or a non-90-degree ply formed of unidirectional tape and forming a crenulated edge in the respective first and second uncured section, the step of interleaving including:
   inserting a tape end of the unidirectional tape of a first composite ply between a pair of the second composite plies.

14. A method of fabricating a composite assembly, including:
   laying up a plurality of first composite plies to form a first layup;
   laying up a plurality of second composite plies to form a second layup;
   inserting a ply separator between at least one pair of the first composite plies and/or between at least one pair of the second composite plies;
   at least partially curing the respective first and second layup to form a respective first and second cured section and a respective first and second uncured section containing the ply separator between the at least one pair of the first composite plies and/or between the at least one pair of the second composite plies;
   preventing, due to insertion of the ply separator, bonding between the at least one pair of the first composite plies and/or between the at least one pair of the second composite plies during the at least partial curing of the respective first and second cured section;
   removing, after the at least partial curing, the ply separator from between the at least one pair of the first composite plies and/or from between the at least one pair of the second composite plies;
   interleaving the first composite plies in the first uncured section with the second composite plies in the second uncured section to form an interfacial region; and
   curing the interfacial region to join the first layup to the second layup and form a unitized composite assembly.

15. The method of claim 14, wherein the steps of curing the first and second layup include:
   heating a respective portion of the first and second layup defining the respective first and second cured section; and
   wherein the heating of the portion of the first and second layup defining the first and second uncured section is less than the heating of the first and second cured section when heating the respective portion of the first and second layup defining the respective first and second cured section.

16. The method of claim 14, wherein the steps of curing the first and second layup include:
   partially curing at least one of the first and second uncured sections to a partial cure state of less than approximately 10 percent.

17. The method of claim 16, wherein the step of partially curing includes:
   partially curing at least one of the first and second uncured sections such that tack is reduced.

18. A method of fabricating a composite assembly, including:
   laying up a plurality of first composite plies and a plurality of second composite plies to respectively form a first layup and a second layup;
   curing to full cure a first cured section and a second cured section of the respective first and second layup;
   partially curing to approximately 5 percent a first uncured section and a second uncured section of the respective first and second layup;
   interleaving at least one of the first composite plies in the first uncured section between a pair of second composite plies in the second uncured section to form an interfacial region, the interleaving of the at least one of the first composite plies with the second composite plies forming an interleaved ply;
   laying up one or more splice plies over the interleaved ply in the interfacial region, the splice plies being different plies from those of the first layup and the second layup; and
   curing the interfacial region to form a unitized composite assembly.

19. The method of claim 1, wherein the step of curing the interfacial region is performed without the use of an autoclave.

20. The method of claim 18, wherein the step of curing the interfacial region is performed without the use of an autoclave.

* * * * *